US012646302B2

(12) United States Patent
Brown et al.

(10) Patent No.: US 12,646,302 B2
(45) Date of Patent: Jun. 2, 2026

(54) DRONE-BASED VEGETATION ASSESSMENT

(71) Applicant: CDM Smith Inc., Boston, MA (US)

(72) Inventors: Brendan V. Brown, Maitland, FL (US);
Andrew C. Reicks, Kansas City, MO
(US)

(73) Assignee: CDM Smith Inc., Boston, MA (US)

( * ) Notice: Subject to any disclaimer, the term of this
patent is extended or adjusted under 35
U.S.C. 154(b) by 446 days.

(21) Appl. No.: 17/817,278

(22) Filed: Aug. 3, 2022

(65) Prior Publication Data

US 2024/0046626 A1 Feb. 8, 2024

(51) Int. Cl.
| | |
|---|---|
| *G06V 10/778* | (2022.01) |
| *G06T 7/62* | (2017.01) |
| *G06T 7/73* | (2017.01) |
| *G06V 10/764* | (2022.01) |
| *G06V 10/94* | (2022.01) |
(Continued)

(52) U.S. Cl.
CPC .............. *G06V 10/778* (2022.01); *G06T 7/62*
(2017.01); *G06T 7/75* (2017.01); *G06V 10/764*
(2022.01); *G06V 10/945* (2022.01); *G06V*
*20/17* (2022.01); *G06V 20/188* (2022.01);
(Continued)

(58) Field of Classification Search
CPC .. G06V 10/778; G06V 10/764; G06V 10/945;
G06V 10/7788; G06V 10/774; G06V
20/17; G06V 20/188; G06V 20/70; G06T
7/62; G06T 7/75; G06T 2207/10032;
G06T 2207/20092; G06T 2207/30188
See application file for complete search history.

(56) References Cited

U.S. PATENT DOCUMENTS

| | | | | |
|---|---|---|---|---|
| 11,049,044 B1 * | 6/2021 | Habenschuss | ........... | G06N 3/08 |
| 11,308,714 B1 * | 4/2022 | Christoudias | ........ | G06V 20/176 |
(Continued)

FOREIGN PATENT DOCUMENTS

| | | | | |
|---|---|---|---|---|
| WO | WO-2022055795 A1 * | 3/2022 | ........... | B64G 1/1021 |
| WO | 2024/030990 A1 | 2/2024 | | |

OTHER PUBLICATIONS

Ahmed et al, Towards Selfie Drone: Spatial Localization and
Navigation of drone Using Human Pose Estimation, 2021, Interna-
tional Conference on Robotics and Automation in Industry, pp. 1-8.
(Year: 2021).*

(Continued)

*Primary Examiner* — Kathleen M Broughton
(74) *Attorney, Agent, or Firm* — Hamilton, Brook, Smith
& Reynolds, P.C.

(57) ABSTRACT

In an embodiment, a method includes selecting an aerial
image, from multiple aerial images, each of the multiple
aerial images associated with one of multiple locations.
Selecting the aerial image is performed corresponding to a
location of a device. The method then presents the aerial
image selected in a user interface, e.g., of the device. The
method then records, via the user interface, a polygon
overlaid on the aerial image and a manual classification
representing an identified surface characteristic within the
polygon. The method further trains a model based on a
portion of the aerial image within the polygon and the
manual classification recorded via the user interface,
wherein the model is trained to identify a surface charac-
teristic in images.

15 Claims, 9 Drawing Sheets
(3 of 9 Drawing Sheet(s) Filed in Color)

(51) Int. Cl.
   *G06V 20/10*          (2022.01)
   *G06V 20/17*          (2022.01)
(52) U.S. Cl.
   CPC .............. *G06T 2207/10032* (2013.01); *G06T 2207/20092* (2013.01); *G06T 2207/30188* (2013.01)

(56)                    References Cited

U.S. PATENT DOCUMENTS

| | | | | |
|---|---|---|---|---|
| 2013/0226515 | A1* | 8/2013 | Pershing ................ | G06Q 50/16 |
| | | | | 702/156 |
| 2016/0127641 | A1* | 5/2016 | Gove ................... | H04N 23/611 |
| | | | | 348/143 |
| 2018/0059660 | A1* | 3/2018 | Heatzig .................. | G06V 20/10 |
| 2018/0330528 | A1* | 11/2018 | Loveland ................ | G06T 11/60 |
| 2021/0012109 | A1 | 1/2021 | Chou et al. | |
| 2022/0019795 | A1 | 1/2022 | Aune et al. | |
| 2022/0366167 | A1* | 11/2022 | Desai ..................... | G06V 20/13 |
| 2024/0005656 | A1* | 1/2024 | Guillo ................... | G06V 10/40 |

OTHER PUBLICATIONS

Polygon Definition, Merriam-Webster definition, accessed Nov. 25, 2024. (Year: 2024).*

Geotag Definition, Dictionary.com definition, accessed Nov. 25, 2024. (Year: 2024).*

Abeysinghe, T., et al. (2019). "Mapping Invasive *Phragmites australis* in the Old Woman Creek Estuary Using UAV Remote Sensing and Machine Learning Classifiers." Remote Sensing 11(11): 1380.

Assmann, J. J., et al. (2018). "Vegetation monitoring using multispectral sensors—best practices and lessons learned from high latitudes." Journal of Unmanned Vehicle Systems 7(1): 54-75.

Baier, S., et al. (2022). "Assessment of Aquatic Reed Stands from Airborne Photogrammetric 3K Data." Remote Sensing 14(2): 337.

Berra, E. F. and M. V. Peppa (2020). Advances and Challenges of UAV SFM MVS Photogrammetry and Remote Sensing: Short Review. 2020 IEEE Latin American GRSS & ISPRS Remote Sensing Conference (LAGIRS).

Berra, E. F., et al. (2019). "Assessing spring phenology of a temperate woodland: A multiscale comparison of ground, unmanned aerial vehicle and Landsat satellite observations." Remote Sensing of Environment 223: 229-242.

Bhatt, R. (2020). Investigating the Variability of Water and Soil Salinity using Watershed Model and Remote Sensing Techniques: A Case Study of Mentor Marsh, Ohio. Department of Civil/Environmental and Chemical Engineering., Youngstown State University. Master of Science in Engineering.

Brooks, C., et al. (2021). "Using Uncrewed Aerial Vehicles for Identifying the Extent of Invasive Phragmites australis in Treatment Areas Enrolled in an Adaptive Management Program." Remote Sensing 13(10): 1895.

Casagrande, L., et al. (2017). Probabilistic Neural Network and Wavelet Transform for Mapping of Phragmites Australis Using Low Altitude Remote Sensing. 2017 30th SIBGRAPI Conference on Graphics, Patterns and Images (SIBGRAPI).

Chabot, D., et al. (2018). "An Object-Based Image Analysis Workflow for Monitoring Shallow-Water Aquatic Vegetation in Multispectral Drone Imagery." ISPRS International Journal of Geo-Information 7(8): 294.

Cohen, O. and A. Héquette (2020). "Recent Advances in Coastal Survey Techniques: From GNSS to LiDAR and Digital Photogrammetry-Examples on the Northern Coast of France." Spatial Variability in Environmental Science—Patterns, Processes, and Analyses.

Dash, J. P. (2020). On the detection and monitoring of invasive exotic conifers in New Zealand using remote sensing. Forestry, University of Canterbury. Doctor of Philosophy.

Dash, J. P., et al. (2019). "Taking a closer look at invasive alien plant research: A review of the current state, opportunities, and future directions for UAVs." Methods in Ecology and Evolution 10(12): 2020-2033.

Doughty, C. L. and K. C. Cavanaugh (2019). "Mapping Coastal Wetland Biomass from High Resolution Unmanned Aerial Vehicle (UAV) Imagery." Remote Sensing 11(5): 540.

Eon, R. S. and C. M. Bachmann (2021). "Mapping barrier island soil moisture using a radiative transfer model of hyperspectral imagery from an unmanned aerial system." Scientific Reports 11(1): 3270.

Fabbri, S., et al. (2021). "Using High-Spatial Resolution UAV-Derived Data to Evaluate Vegetation and Geomorphological Changes on a Dune Field Involved in a Restoration Endeavour." Remote Sensing 13(10): 1987.

Fairley, I., et al. (2020). "Spatial Variation in Coastal Dune Evolution in a High Tidal Range Environment." Remote Sensing 12(22): 3689.

Fluor Tech., Geographic Information Systems (GIS), https://www.fluor.com/about-fluor/corporate-information/technologies/g (Downloaded from the Internet on Aug. 25, 2022).

Furukawa, F., et al. (2021). "Comparison of RGB and Multispectral Unmanned Aerial Vehicle for Monitoring Vegetation Coverage Changes on a Landslide Area." Drones 5(3): 97.

Gaden, K. (2020). "Assessing potential of UAV multispectral imagery for estimation of AGB and carbon stock in conifer forest over UAV RGB imagery." Geo-information Science and Earth Observation, University of Twente. MA.

Geomatics Tech. Group—Tetra Tech, https://www.tetratech.com/en/documents/geomatics-technologies-group, (Downloaded from the Internet on Aug. 25, 2022).

Kantarcioglu, O. (2021). "Vegetation Cover Extraction And Monitoring Using Images Obtained From Aerial And Satellite Platforms." Graduate School of Science and Engineering, Hacettepe University. MS.

Librán-Embid, F., et al. (2020). "Unmanned aerial vehicles for biodiversity-friendly agricultural landscapes—A systematic review." Science of The Total Environment 732: 139204.

Liu, T. and A. Abd-Elrahman (2019). "Multi-View, Deep Learning, and Contextual Analysis: Promising Approaches for sUAS Land Cover Classification." Applications of Small Unmanned Aircraft Systems: Best Practices and Case Studies, CRC Press: 133-156.

Lu, B., et al. (2019). "Comparing the Performance of Multispectral and Hyperspectral Images for Estimating Vegetation Properties." IEEE Journal of Selected Topics in Applied Earth Observations and Remote Sensing 12(6): 1784-1797.

Mafanya, M. (2018). Framework for semi-automated object-based image classification of invasive alien plant species in South Africa: Harrisia pomanensis as a case study, University of Pretoria.

Mapes, K. L., et al. (2020). "Thermal Imaging of Beach-Nesting Bird Habitat with Unmanned Aerial Vehicles: Considerations for Reducing Disturbance and Enhanced Image Accuracy." Drones 4(2): 12.

Marzialetti, F., et al. (2021). "Unmanned Aerial Vehicle (UAV)-Based Mapping of Acacia saligna Invasion in the Mediterranean Coast." Remote Sensing 13(17): 3361.

Nautiyal, S., et al, "Delineation and Monitoring of FMV, Field Margin Vegetation and Socio-Ecological Environment: Structural, Functional and Spatio-temporal Dynamics in Rural-urban Interface of Bengaluru," S. Nautiyal, M. Goswami and P. Shivakumar, Cham, Springer International Publishing: 95-113 (2021).

Oldeland, J., et al. (2021). "New tools for old problems—comparing drone- and field-based assessments of a problematic plant species." Environmental Monitoring and Assessment 193(2): 90.

Park, S.-I., et al. (2021). "Estimating blue carbon accumulated in a halophyte community using UAV imagery: a case study of the southern coastal wetlands in South Korea." Journal of Coastal Conservation 25(3): 38.

Powers, S. T. (2017). Multi-scale Approaches for Evaluating the Success of Habitat Restoration in Tampa Bay, Florida. School of Geosciences, University of South Florida. Doctor of Philosophy.

R. Morgan, G., et al. (2022). "Unmanned aerial remote sensing of coastal vegetation: A review." Annals of GIS: 1-15.

(56)        References Cited

OTHER PUBLICATIONS

Ridge, J. T. and D. W. Johnston (2020). "Unoccupied Aircraft Systems (UAS) for Marine Ecosystem Restoration." Frontiers in Marine Science 7.

Sabat-Tomala, A., et al. (2022). "Mapping Invasive Plant Species with Hyperspectral Data Based on Iterative Accuracy Assessment Techniques." Remote Sensing 14(1): 64.

Samiappan, S., et al. (2017). "Classifying common wetland plants using hyperspectral data to identify optimal spectral bands for species mapping using a small unmanned aerial systems—A case study. 2017 IEEE International Geoscience and Remote Sensing Symposium" (IGARSS).

Samiappan, S., et al. (2018). Texture Classification of Very High Resolution UAS Imagery Using a Graphics Processing Unit. IGARSS 2018—2018 IEEE International Geoscience and Remote Sensing Symposium.

Seier, G., et al., "Unmanned aircraft systems for protected areas: Gadgetry or necessity?"), J. Nat. Cons., 64:126078, (2021).

Smith, A., et al. (2020). Monitoring storm impacts on sandy coastlines with UAVs. Spatial Variability in Environmental Science—Patterns, Processes, and Analyses, IntechOpen.

Surveying and Mapping—Tetra Tech, https://www.tetratech.com/en/surveying-and-mapping, (Downloaded from the Internet on Aug. 25, 2022).

Svane, N., et al. (2022). "Physical stream quality measured by drones and image analysis versus the traditional manual method." Environmental Technology 43(8): 1237-1247.

Unmanned Aerial Vehicles/WSP, https://www.wsp.com/en-CA/services/unmanned-aerial-vehicles, (Downloaded from the Internet on Aug. 25, 2022).

Woodard & Curran, "Geospatial Business Spotlight", eSpatially New York, https://espatiallynewyork.com/2021/08/04/geospatial-business-spotlight-woodard-curran, (Downloaded from the Internet on Aug. 25, 2022).

Xia, L., et al. (2019). "Monitor Cotton Budding Using SVM and UAV Images." Applied Sciences 9(20): 4312.

Zykov, V., et al. (2005). Co-evolutionary variance can guide physical testing in evolutionary system identification. 2005 NASA/DoD Conference on Evolvable Hardware (EH'05).

International Search Report and Written Opinion received for PCT Patent Application No. PCT/US2023/071568, mailed on Oct. 13, 2023, 17 pages.

* cited by examiner

DRONE-BASED VEGETATION ASSESSMENT

BACKGROUND

Machine-learning models are statistical models that can be trained to identify patterns or generate new information. Machine-learning models are trained on data representing a ground truth.

SUMMARY

In an embodiment, a method includes selecting an aerial image, from multiple aerial images, each of the multiple aerial images associated with one of multiple locations. Selecting the aerial image is performed corresponding to a location of a device. The method then presents the aerial image selected in a user interface. In some embodiments, the aerial image is selected on the device at the location. The method then records, via the user interface, a polygon overlaid on the aerial image and a manual classification representing an identified surface characteristic within the polygon. The method further trains a model based on a portion of the aerial image within the polygon and the manual classification recorded via the user interface, wherein the model is trained to identify a surface characteristic in images.

In some embodiments, the model is a classifier, but a person of ordinary skill in the art can recognize that the model can be any statistical model including a machine-learning model and a neural network.

In an embodiment, the method further includes presenting a second aerial image in the user interface of the device, the second aerial image selected from the plurality of aerial images of the plurality of locations by selecting the second aerial image corresponding to a second location of the device. The method further includes recording, via the user interface, a second polygon overlaid on the second aerial image and a second manual classification representing a second identified surface characteristic within the second polygon. The method includes further training the model based on the portion of the second aerial image within the second polygon and the second manual classification recorded via the user interface.

In an embodiment, the multiple aerial images can include an aerial photograph and a multispectral orthophotograph. In another embodiment, the aerial image can include a three-dimensional (3D) point cloud or a canopy height cloud.

In an embodiment, the digital resolution of the aerial image presented in the user interface is adjustable.

In an embodiment, the aerial image is one of the multiple aerial images presented in the user interface of the device in respective locations, and a respective plurality of polygons are recorded on each aerial image representing respective manual classifications, such that the respective plurality of polygons represents classifications of surface characteristics representative of the plurality of aerial images.

In an embodiment, recording the polygon is responsive to the user drawing the polygon on the user interface.

In an embodiment, the identified characteristic is a plant classification.

In an embodiment, the model is a classifier.

In an embodiment, the model is a machine-learning model.

In an embodiment, a method includes inputting a given aerial image of a location to a classifier. The classifier is trained based on (i) user-selected polygons within portions of a plurality of aerial images and (ii) user-selected classifications. The method further includes identifying one or more surface characteristics within the given aerial image using the classifier. The method further includes outputting the identified surface characteristic.

In some embodiments, the user-selected classifications were recorded at real-world locations of the portions.

In an embodiment, outputting the identified surface characteristic includes outputting a list of surface characteristics, their locations, and spatial extent.

In an embodiment, outputting the identified surface characteristic includes outputting a series of spatially located polygons.

In an embodiment, outputting the identified surface characteristics includes outputting the given aerial image with respective polygons illustrating each identified surface characteristic.

In an embodiment, outputting the identified surface characteristic includes outputting the spatially located polygons identified with the surface characteristic on a display.

In an embodiment, a system includes a processor and a memory with computer code instructions stored thereon. The processor and the memory, with the computer code instructions, are configured to cause the system to select an aerial image, from a plurality of aerial images, each aerial image associated with one of a plurality of locations, corresponding to a location of a device. The processor is further configured to present the aerial image selected in a user interface of the device. The processor is further configured to record, via the user interface, a polygon overlaid on the aerial image and a manual classification representing an identified surface characteristic within the polygon. The processor is further configured to train a model based on a portion of the aerial image within the polygon and the manual classification recorded via the user interface. The model is trained to identify a surface characteristic in images.

In an embodiment, the processor is further configured to present a second aerial image in the user interface of the device, the second aerial image selected from the plurality of aerial images of the plurality of locations by selecting the second aerial image corresponding to a second location of the device. The processor is further configured to record, via the user interface, a second polygon overlaid on the second aerial image and a second manual classification representing a second identified surface characteristic within the second polygon. The processor is further configured to train the model based on the portion of the second aerial image within the second polygon and the second manual classification recorded via the user interface.

In an embodiment, the aerial images include one or more of an aerial photograph or a multispectral orthophotograph.

In an embodiment, the digital resolution of the aerial image presented in the user interface is adjustable.

In an embodiment, the aerial image is one of a plurality of aerial images presented in the user interface of the device in respective locations, and a respective plurality of polygons are recorded on each aerial image representing respective manual classifications, such that the respective plurality of polygons represents classifications of surface characteristics representative of the plurality of aerial images.

In an embodiment, the processor is further configured to enable the user drawing the polygon on the user interface.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
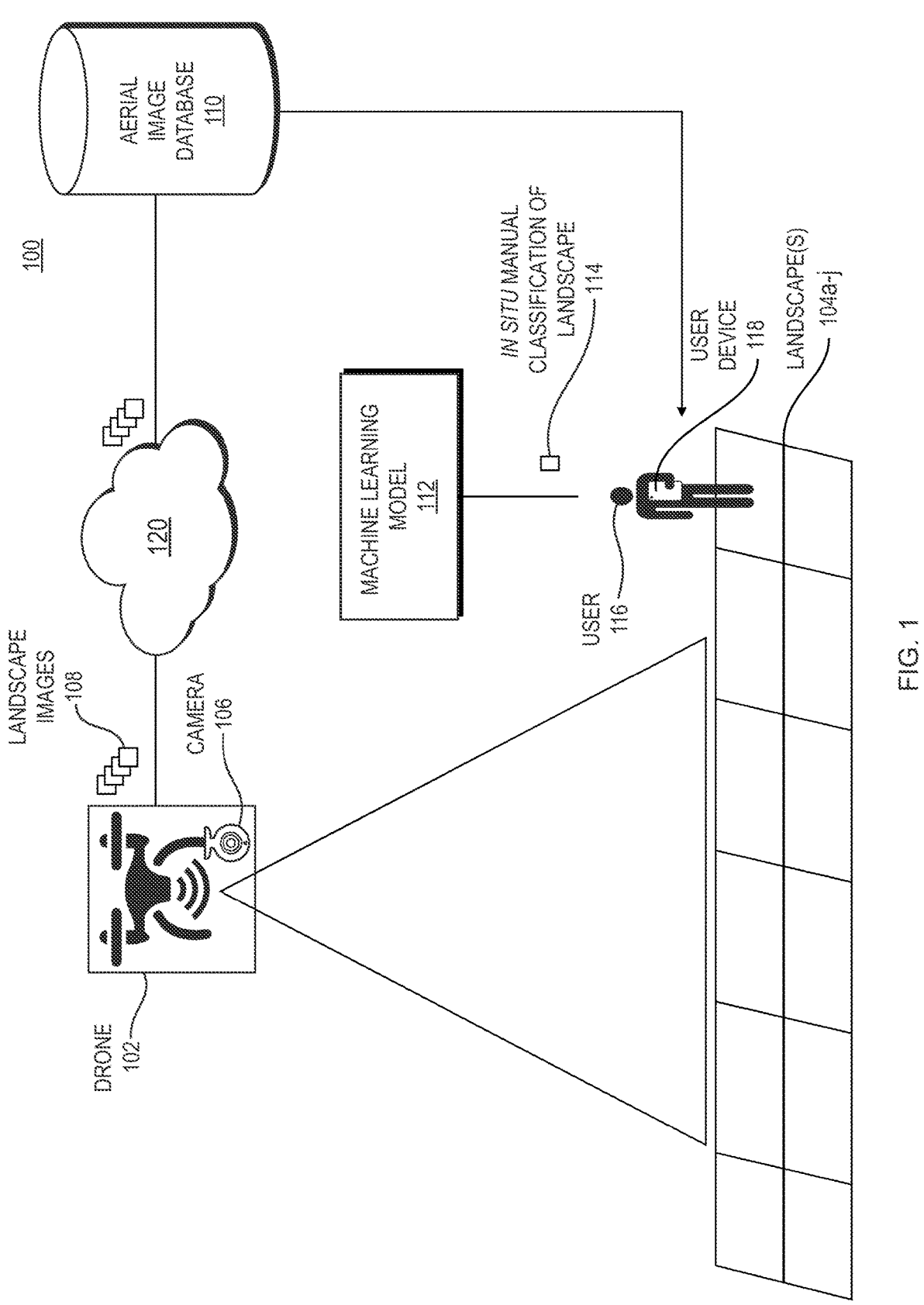
FIG. 1 is a block diagram illustrating an example embodiment of training a machine learning model of the present disclosure.

A description of example embodiments follows.

Landscape mapping is a labor-intensive problem. Manual mapping requires many man hours to perform accurately, either in the field or digitally with drone or satellite images. Current automation methods have inefficient and inaccurate ways of modeling. For example, one current method employs a survey rod or a handheld camera to acquire images manually, and those images are later marked up in an office or non-field (ex situ) setting. This is time consuming and labor intensive because a researcher spends time to set up each photo, and then later manually classify the photos ex situ. In addition, this introduces inaccuracies because the researcher is not in the field while they are manually classifying the images and manually entering the location of the images.

Current methods employ satellite data to train machine learning models, however, such training still requires ground truthing. The methods of ground truthing are described above, and remain labor intensive and create inaccuracies.

In another current method, researchers printed out a paper version of a drone-derived orthophotograph and marked that paper version up in the field. This method introduces multiple inefficiencies and inaccuracies by losing accuracy via printing and hand drawing. Further, this system's markup is not used to train a machine-learning model or develop a model, but is simply for comparison to other model results. In contrast, embodiments employ digitized polygons collected in the field in both the development and validation of the model.

Further, satellite collected images used by existing methods do not have the resolution that can be achieved using low-altitude drones to collect images.

Therefore, in one embodiment, it is advantageous to provide geotagged aerial images acquired by a drone of a landscape to a user in situ in the landscape, such that the user can annotate or tag the images of the landscape while the user is at the physical location pictured. This provides a better ground truthing of the landscape for future modeling.

In one example embodiment, the method can be used to map invasive species of flora and fauna (e.g., forest, wetlands), but any sort of mapping can be performed (e.g., identifying road features like potholes, faded lane lines, etc., identifying roofing maintenance needs, etc.). In embodiments, non-visual light from the electromagnetic spectrum can be used, as well as other imaging such as ultrasonic, radar, lidar, etc.

In the present method, satellite images are used with drone images to increase resolution, and the ground truthing is improved by allowing it to be collected in situ with geotagged images displayed to the user while the user is at the location where the image was collected. A user device having a global positioning system (GNSS, such as GPS) unit displays an image corresponding to the device's location for annotation. Real-time kinematic positioning can be applied to increase accuracy of the GPS unit to the level of inches, and can port multiple aerial images into a mosaic of the landscape. The annotations are entered by the user drawing polygons around identified features. In some embodiments, the user can also draw non-polygonal shapes such as circles and ellipses. The annotations are geotagged based on their location within the image. The annotations, their locations within the image, and images of the landscape are then used to train a model, such as machine-learning model.

FIG. 1 is a block diagram 100 illustrating an example embodiment of training a machine learning model 112 of the present disclosure. In the embodiment, a drone 102 equipped with a camera 106 surveys landscape(s) 104*a-j*, producing landscape images 108. Each landscape image 108 corresponds with one of the physical landscape(s) 104*a-j* and is geotagged with the location of the images, e.g., longitude and latitude. The landscape images 108 are stored in an aerial image database 110 along with the respective geotags. A person having ordinary skill in the art can recognize that the geotagging may be implemented in a variety of ways, including geotagging a reference point of the image (e.g., a corner or center), or geotagging multiple or all pixels in the image.

A user 116, located in one of the imaged landscapes 104*a*, is using a user device 118. The user device 118, is running an annotation application as disclosed herein. The user device 118, running the application, acquires the location of the user 116 via a GPS or other location module, and displays the aerial image of the landscape 104*a* to the user 116 on the user device 118. Ideally, the aerial image is taken close in time to the user classifying the images so that the surface characteristics in real-life do not change relative to the aerial images. For example, if the user is performing plant identification, certain plants may bloom within days of the aerial image being captured, and therefore it is best to perform the in situ survey while the aerial image represent real world conditions. The amount of time between capturing the aerial images and doing the in situ survey before affecting accuracy depends on the rate of change of the surface conditions, but could vary from hours, days, weeks, or months, depending on the application.

The user 116 can then annotate the aerial image of the landscape 104*a* by drawing polygons around features and labeling them with a tag. In an embodiment, drawing polygons can be done on a touch screen with a finger or stylus, or on a non-touch screen with a pointing device. The annotations are drawn by the user 116 in the form of a polygon on the aerial image accompanied by a label, e.g., tag. In other embodiments, the user can input the annotation by drawing a selection layer for each annotation, for example, by highlighting every pixel accompanying the annotated tag. However, a person having ordinary skill in the art can further recognize that such a layer can be converted to a polygon. The in situ manual classification of the landscape 114 is then used to train a machine learning model 112 (along with classifications of the other landscapes 104b-j). The manual classifications, e.g., 114, act as ground truths for the machine learning model 112 to be trained on. With a sufficient training data set, the machine learning model 112 can then identify the landscape features provided to it in future unannotated images. A sufficient data set depends on the training task, characteristics of the surface and surface features. For example, simpler classifications, such as classifications between features that are spectrally distinct, can require fewer examples than complex classifications, such as classifications between features that are spectrally close. In one embodiment, five polygons per feature class is a minimum to train the machine learning model 112, however, a person of ordinary skill in the art can recognize that more examples per feature class can lead to higher accuracy. Therefore, as a minimum, training a model with 100 feature classes would require at least 5 polygons for each feature class.

Figure 2:
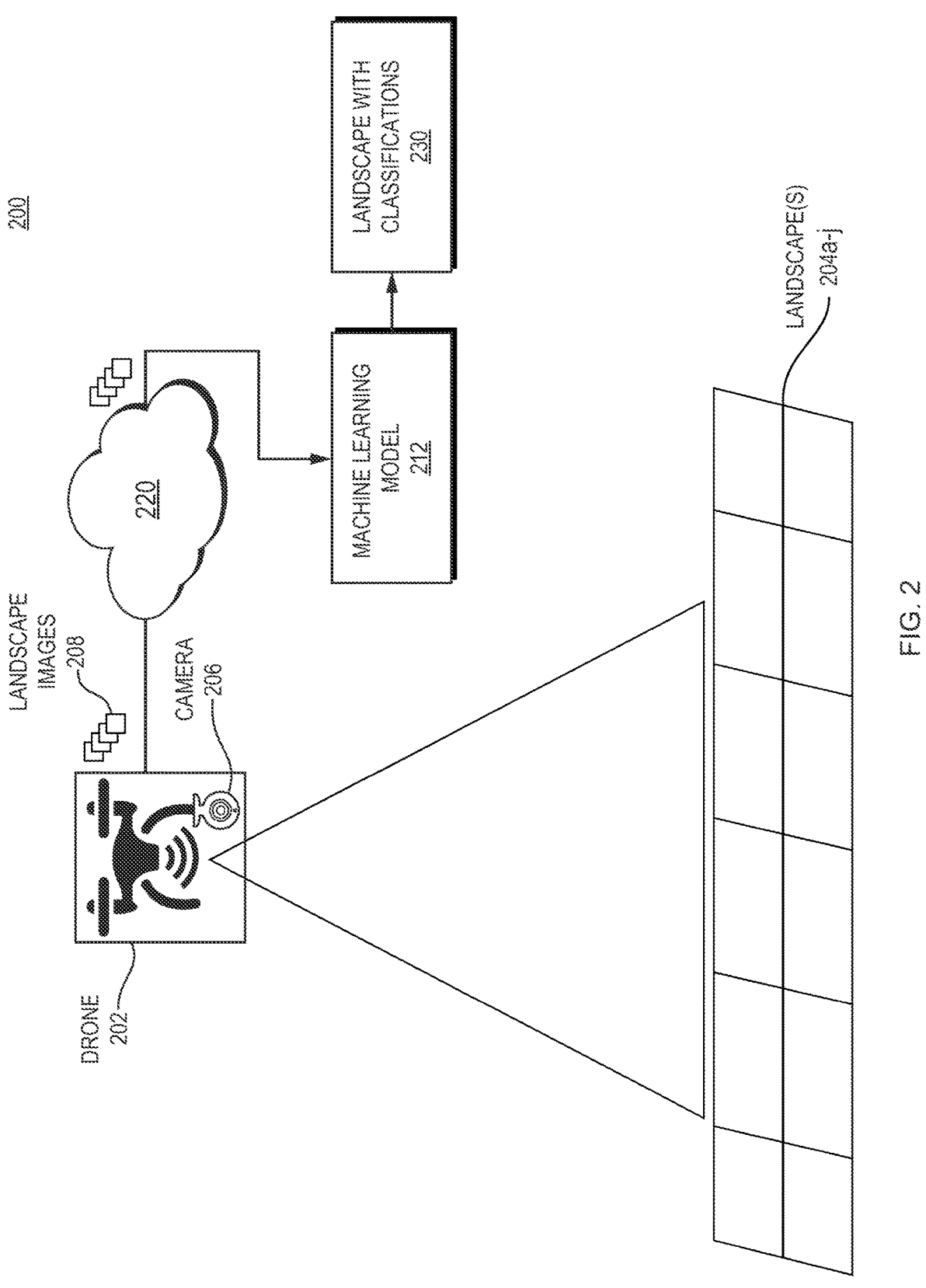
FIG. 2 is a block diagram illustrating an example embodiment of using the trained machine learning model of the present disclosure.

FIG. 2 is a block diagram 200 illustrating an example embodiment of using the trained machine learning model 212 of the present disclosure. A drone 202 with a camera 206 surveys a landscape 204a-j, producing landscape images 208. A person having ordinary skill in the art can recognize that landscape 204a-j, and therefore landscape images 208, are distinct from landscape 104a-j and landscape images 108 of FIG. 1. Referring to FIG. 2, the landscape images 208 are uploaded (e.g., via the cloud 220) to the machine learning model 212 that has been trained in the manner described in relation to FIG. 1. The machine learning model 212 outputs a landscape with classifications 230, e.g., an indication of classifications of portions of the landscape 204a-j.

Figure 3:
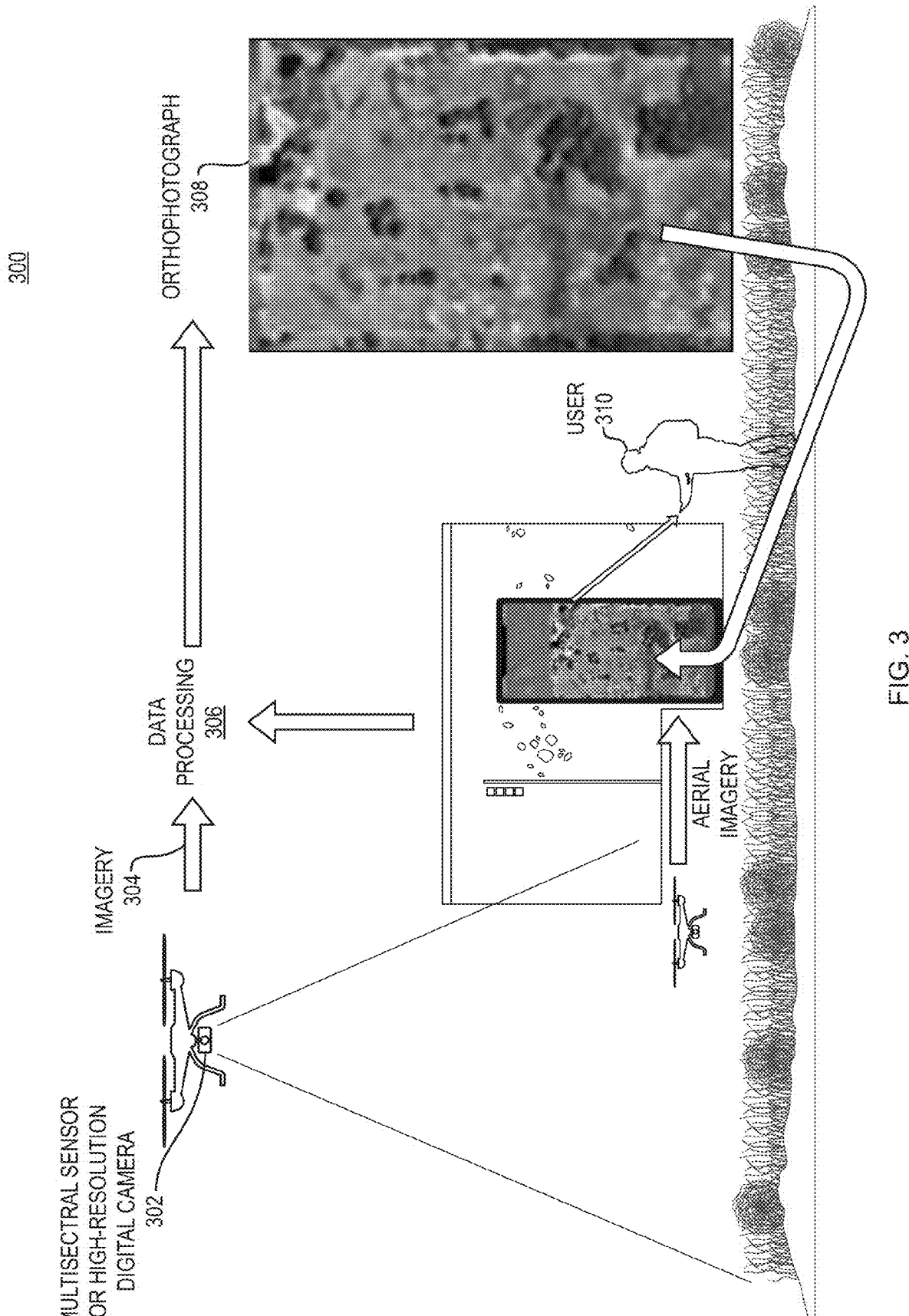
FIG. 3 is a diagram illustrating an embodiment of the present disclosure.

FIG. 3 is a diagram 300 illustrating an embodiment of the present disclosure. A multispectral sensor or high-resolution digital camera 302 attached to a drone surveys a landscape and outputs imagery 304. A person having ordinary skill in the art can recognize that other cameras and imaging devices can be employed. In embodiments, the camera 302 can be a sensor that detects ultra-violet, infra-red, or other parts of the electromagnetic spectrum. The imagery 304 is then converted 306 to an orthophotograph 308, or an aerial photograph that is geometrically corrected to accurately represent Earth's surface (e.g., applying topographic relief, lens distortion, and camera tilt correction). A user 310 annotates the images on a mobile device in the manner described in relation to FIG. 1.

Figure 4:
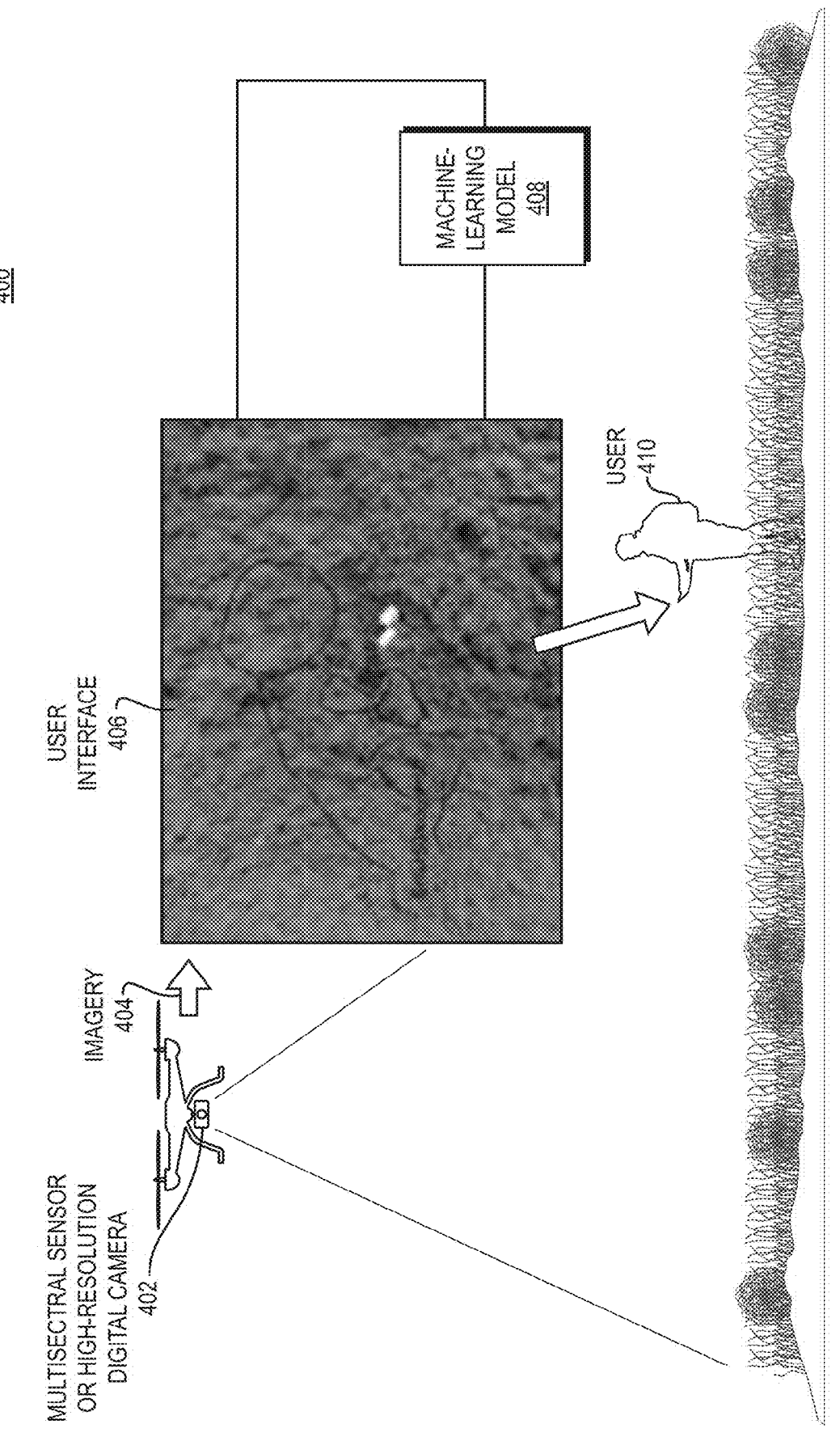
FIG. 4 is a diagram illustrating an embodiment of the present disclosure.

FIG. 4 is a diagram 400 illustrating an embodiment of the present disclosure. A multispectral sensor or high-resolution digital camera 402 attached to a drone surveys a landscape and outputs imagery 404. A person having ordinary skill in the art can recognize that other cameras and imaging devices can be employed. In embodiments, the camera 402 can be a sensor that detects ultra-violet, infra-red, or other parts of the electromagnetic spectrum. The imagery 404 can be imagery that has been converted to an orthophotograph, or an aerial photograph that is geometrically corrected to accurately represent Earth's surface (e.g., applying topographic relief, lens distortion, and camera tilt correction). The imagery 404 is displayed in a user interface 406 to the user 410, allowing the user to annotate the orthophotograph by drawing polygons around features and applying tags to the annotated regions. The imagery 404 with the user 410 applied annotations can, in turn, be used to train the machine learning model 408.

Figure 5:
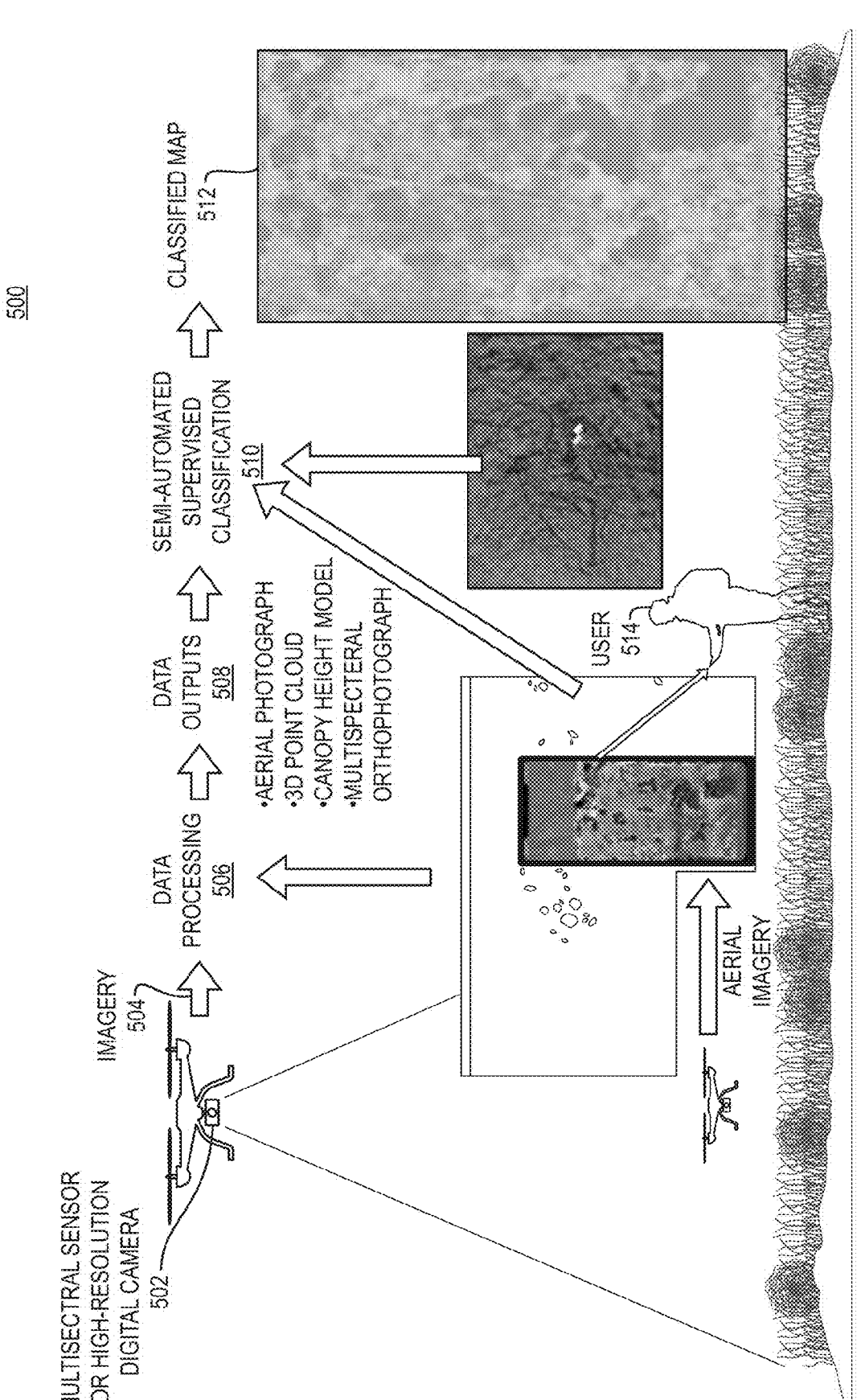
FIG. 5 is a diagram illustrating an embodiment of the present disclosure.

FIG. 5 is a diagram 500 illustrating an embodiment of the present disclosure. A multispectral sensor or high-resolution digital camera 502 attached to a drone surveys a landscape and outputs imagery 504. A person having ordinary skill in the art can recognize that other cameras and imaging devices can be employed. In embodiments, the camera 502 can be a sensor that detects ultra-violet, infra-red, or other parts of the electromagnetic spectrum. The imagery 504 is processed by a data processing module 506 that outputs modified imagery 508 for the machine-learning process 510. In the embodiment 500, the data output 508 is one or more of an orthophotograph, a multispectral orthophotograph, a canopy height model, a 3D point cloud, or an aerial photograph. The data output 508 is presented to the user 514 on a user device for annotation as described above. The data outputs 508 and annotations are provided to a semi-automated supervised classification process 510 or other machine-learning model and outputs a classified map 512.

Figure 6:
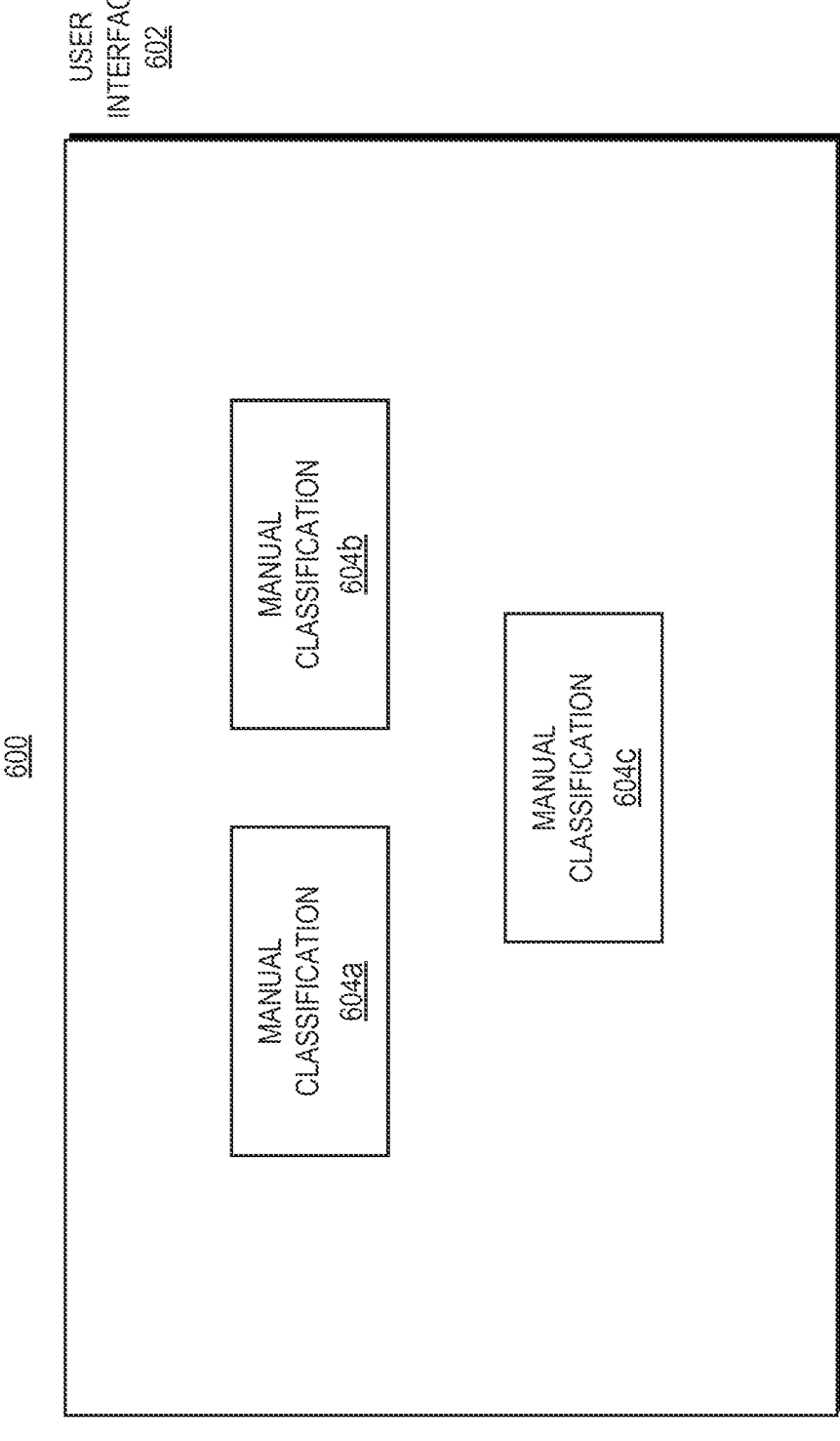
FIG. 6 is a diagram illustrating an example embodiment of a user interface.

FIG. 6 is a diagram 600 illustrating an example embodiment of a user interface 602. The user interface 602 displays an aerial image (e.g., an orthophotograph) 606, and a user can add polygons of manual classifications 604a-c of that image 606. These manual classifications 604a-c are provided to a machine-learning process to train a model.

Figure 7:
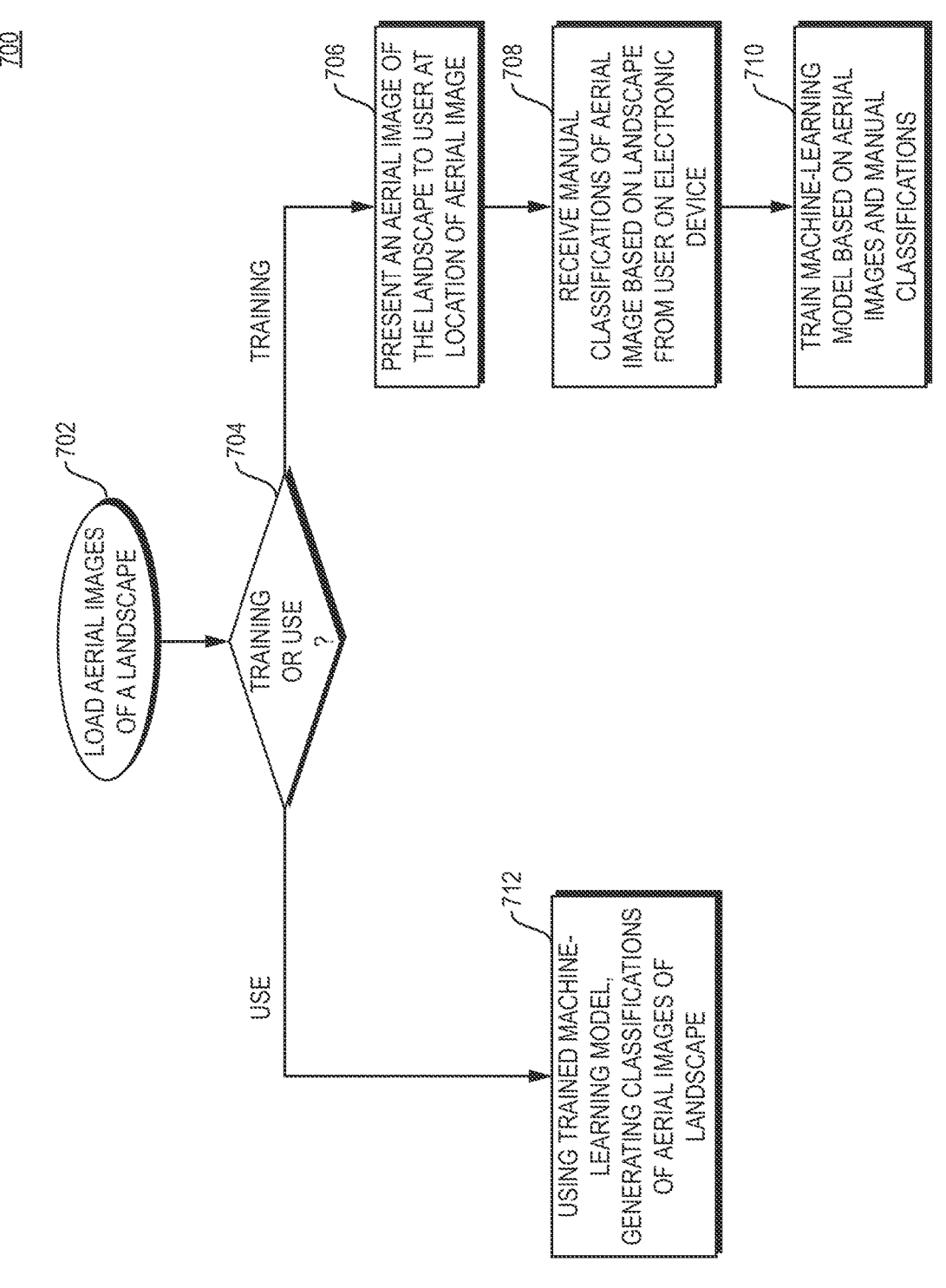
FIG. 7 is a flow diagram illustrating training and use of the system and method described in the present disclosure.

FIG. 7 is a flow diagram 700 illustrating training and use of the system and method described in the present disclosure. The method begins by loading aerial images of a landscape (702). When the images are for training (704), the training process begins by presenting an aerial image of the landscape to a user at a location of the aerial image (706). The user then receives manual classifications of the aerial image based on the landscape from a user on an electronic device (708). Then the method trains the machine-learning model based on aerial images and the manual classifications (710). Once a machine-learning model is trained with enough ground truth data, the system can use the model (704). To use the model, aerial images of a landscape are applied to the trained machine-learning model to generate classifications of an aerial image of a landscape (712). The classifications can be in the form of a classification map or list of areas in the maps having the classifications.

Figure 8:
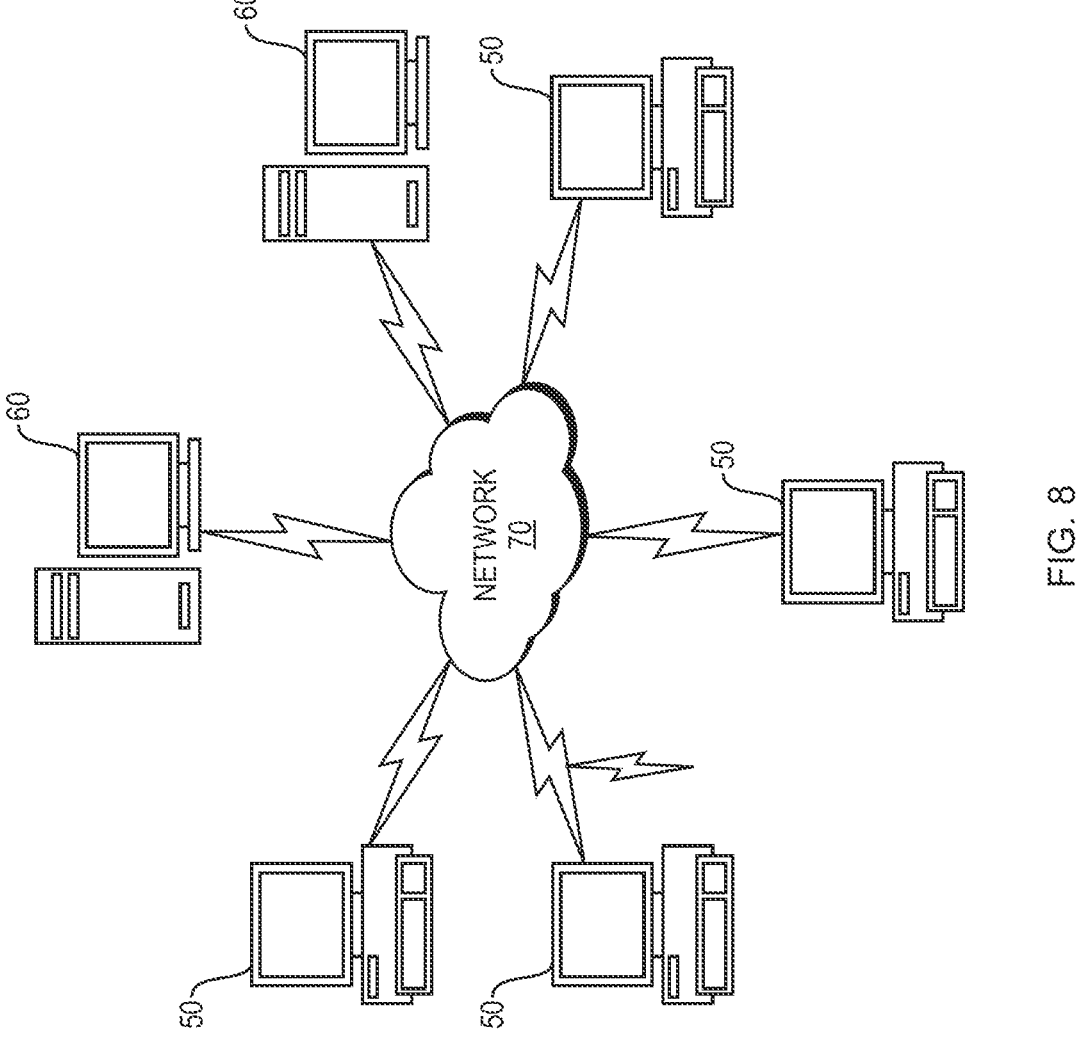
FIG. 8 illustrates a computer network or similar digital processing environment in which embodiments of the present invention may be implemented.

FIG. 8 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 9:
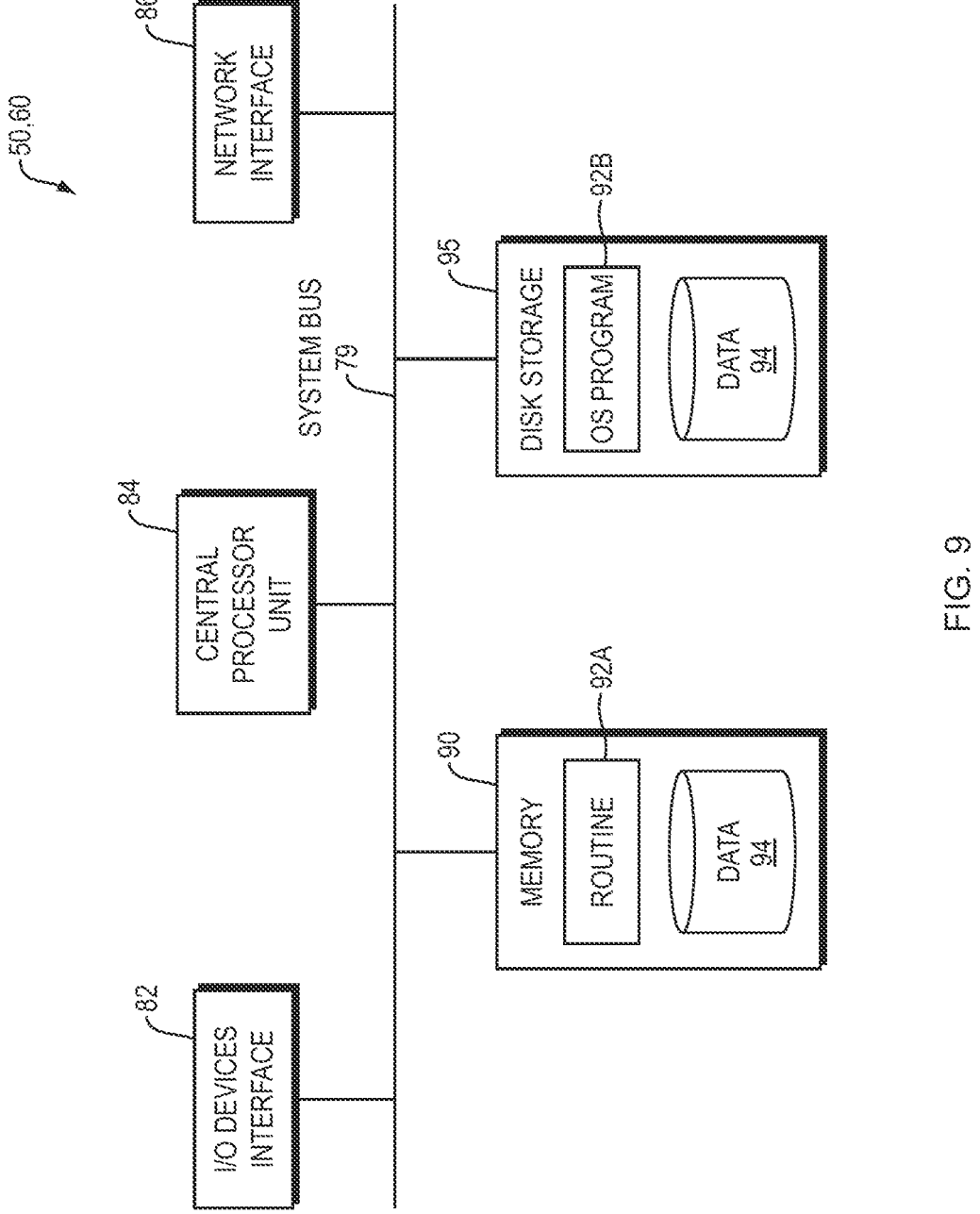
FIG. 9 is a diagram of an example internal structure of a computer (e.g., client processor/device or server computers) in the computer system of FIG. 8.

FIG. 9 is a diagram of an example internal structure of a computer (e.g., client processor/device 50 or server computers 60) in the computer system of FIG. 8. Each computer 50, contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 8). Memory 90 provides volatile storage for computer software instructions 92 and data 94 used to implement an embodiment of the present invention (e.g., machine learning module, data processing module, aerial images database module, user interface module, and aerial image collection module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method comprising:
   determining a location of a device;
   from amongst a plurality of aerial images, each aerial image of the plurality of aerial images associated with one of a plurality of locations, selecting an aerial image corresponding to the determined location of the device;
   wherein the selected aerial image is a geotagged aerial image;
   while the device is at the determined location, presenting the aerial image selected in a user interface of the device;
   recording, via the user interface, a polygon overlaid on the aerial image and a manual classification representing an identified surface characteristic within the polygon; and
   training a model based on a portion of the aerial image within the polygon and the manual classification recorded via the user interface, wherein the model is trained to identify a surface characteristic in images.

2. The method of claim 1, wherein the selecting, presenting, and recording are performed in real-time on the user interface.

3. The method of claim 1, further comprising:
   presenting a second aerial image in the user interface of the device, the second aerial image selected from the plurality of aerial images of the plurality of locations by selecting the second aerial image corresponding to a second location of the device;
   recording, via the user interface, a second polygon overlaid on the second aerial image and a second manual classification representing a second identified surface characteristic within the second polygon; and
   training the model based on a portion of the second aerial image within the second polygon and the second manual classification recorded via the user interface.

4. The method of claim 1, wherein the plurality of aerial images includes a multispectral orthophotograph.

5. The method of claim 1, wherein digital resolution of the aerial image presented in the user interface is adjustable.

6. The method of claim 1, wherein the aerial image presented is one of a plurality of aerial images presented in the user interface, and a respective plurality of polygons is recorded on each aerial image presented, each respective polygon corresponding to a manual classification representing a classification of one or more surface characteristic within the polygon.

7. The method of claim 1, wherein recording the polygon is responsive to a user drawing the polygon on the user interface.

8. The method of claim 1, wherein the identified characteristic is a plant classification.

9. The method of claim 1, wherein the model is at least one of a machine-learning model and a classifier.

10. The method of claim 1, wherein the polygon is geotagged with a corresponding real-world location.

11. The method of claim 1, wherein the location of the device is determined using a global positioning system of the device.

12. A system comprising:
   a processor; and
   a memory with computer code instructions stored thereon, the processor and the memory, with the computer code instructions, being configured to cause the system to:
   determine a location of a device;
   from amongst a plurality of aerial images, each aerial image of the plurality of aerial images associated with one of a plurality of locations, select an aerial image corresponding to the determined location of the device;
   wherein the selected aerial image is a geotagged aerial image;
   while the device is at the determined location, present the aerial image selected in a user interface of the device;
   record, via the user interface, a polygon overlaid on the aerial image and a manual classification representing an identified surface characteristic within the polygon; and
   train a model based on a portion of the aerial image within the polygon and the manual classification recorded via the user interface, wherein the model is trained to identify a surface characteristic in images.

13. The system of claim 12, wherein the processor is further configured to:
   present a second aerial image in the user interface of the device, the second aerial image selected from the plurality of aerial images of the plurality of locations by selecting the second aerial image corresponding to a second location of the device;

record, via the user interface, a second polygon overlaid on the second aerial image and a second manual classification representing a second identified surface characteristic within the second polygon; and train the model based on the portion of the second aerial image within the second polygon and the second manual classification recorded via the user interface.

14. The system of claim 12, wherein the plurality of aerial images includes a multispectral orthophotograph.

15. The system of claim 12, wherein the location of the device is determined using a global positioning system of the device.

\* \* \* \* \*